Nov. 12, 1974  J. O. CONFER ET AL  3,848,040
APPARATUS AND METHOD FOR FORMING SLIP CAST BODIES WITH CAVITIES
Filed April 17, 1969  2 Sheets-Sheet 1

INVENTORS.
James O. Confer
George D. McTaggart
BY
Richard N. Wardell
ATTORNEY

Nov. 12, 1974    J. O. CONFER ET AL    3,848,040
APPARATUS AND METHOD FOR FORMING SLIP CAST BODIES WITH CAVITIES
Filed April 17, 1969    2 Sheets-Sheet 2

INVENTORS.
James O. Confer
George D. McTaggart
BY
Richard N. Wardell
ATTORNEY

United States Patent Office 3,848,040
Patented Nov. 12, 1974

3,848,040
APPARATUS AND METHOD FOR FORMING SLIP CAST BODIES WITH CAVITIES
James O. Confer, Tioga, Pa., and George D. McTaggart, Corning, N.Y., assignors to Corning Glass Works, Corning, N.Y.
Filed Apr. 17, 1969, Ser. No. 817,095
Int. Cl. B28b *1/26, 7/18, 7/34;* C04b *33/28, 33/32*
U.S. Cl. 264—86           9 Claims

ABSTRACT OF THE DISCLOSURE

In a vehicle-absorbent mold, there is provided at least one integrally formed, segmentally removable, composite core means of organic polymer foam and plaster segments. Portions of each of these segments form the external surface of the core means, but the plaster segment or segments form the greater part of such surface that constitutes a cavity-forming surface. This core means cooperates with the mold to define a mold cavity into which is cast a slip of particulate inorganic material in volatile vehicle. After the mold and core means have absorbed sufficient vehicle from the cast slip to develop shape-retaining surfaces of a green body, the core means is segmentally removed to leave a formed cavity in the green body. Segmental removal of the core means involves first removing the foam by means of solvent or heat, and then laterally moving the plaster segment or segments into the space theretofore occupied by the foam followed by easy removal from the green body cavity.

BACKGROUND OF THE INVENTION

Slip casting is a process employed for forming a variety of shaped articles or bodies from various particulate inorganic materials. Typical examples of such materials are appropriately sized powders of ceramic materials (e.g. oxides in glass and/or crystalline form—including glass-ceramic—, carbides, borides, etc.) metallic materials (e.g. metals, metalloids or alloys thereof) and mixtures of ceramic and metallic materials (e.g. cerments). These particulate materials are suitably suspended or dispersed in a volatile deflocculating liquid or vehicle to form castable slips of slurries that are typically cast against forming surfaces of porous plaster molds. During the molding phase, the vehicle of the cast slip is substantially absorbed by the plaster so that the solids of the slip build up a hardened mass on and/or between the forming surfaces to yield substantially rigid green bodies with configurations dictated by the forming or molding surfaces.

There frequently are cases where it is desired to form hollow bodies or shaped bodies with cavities or internal configurations. This is accomplished by either the special variant of slip casting known as drain casting or employing core members typically of porous plaster.

Drain casting is commonly employed for producing rather thin-walled hollow bodies with relatively uncomplicated cavity configurations that substantially imitate the external configurations of the same bodies. Only the external configurations are produced directly against forming surfaces since the cavity configurations result from draining or pouring out a substantial portion of the slip from the mold before it hardens therein. Of course, this procedure greatly limits the types and precision of cavity shapes that can be formed.

In other cases, the cavities are produced by forming surfaces of porous plaster cores appropriately positioned in the mold cavities, but this technique also is not adequate for many desired internal configurations. Where the desired forming surfaces of porous cores are continuous upwardly divergent, one-piece plaster cores can be utilized since they can be readily removed after the cast slip has formed shape-retaining mass thereagainst. However, where the desired, upwardly extending, forming surfaces are substantially vertical (without adequate upwardly divergent taper or draft angle) and/or, at least in part, convergent, one-piece plaster cores cannot be used because they cannot be removed. Therefore, the latter circumstances require that each core be made of multiple plaster parts that, when assembled and having formed a shape-retaining cavity-defining surface of hardened cast slip, can be sequentially removed from the resulting cavity.

Nevertheless, multi-part plaster cores are not always practicable. For example, with most slip formulations, the initially formed, hardened, green mass will usually undergo slight but significant shrinkage as the porous forming surface continues to remove vehicle from the remaining hardening slip in the mold cavity. With respect to a cavity-forming core, this means that the formed green body will shrink tightly around and onto the core (especially one with vertical and/or converging surfaces), thereby making it very difficult, if not impossible, to remove even a multi-part core and causing stresses to build up in the green structure (especially in cases of differing wall thicknesses in such structure) that result in cracking therein before it is possible to remove enough parts of the plaster core to relieve these stresses. This problem becomes especially acute when the desired green body is to have a highly complex internal configuration, such as a great many discrete cavities where it becomes impracticable to simultaneously remove parts of so many plaster cores quick enough to avoid the detrimental shrinkage stresses.

Another shortcoming of multi-part plaster cores arises when it is desired to provide precision shape and size to green bodies, so that, after they have been fired, finish machining or shaping is unnecessary or minimal. First, it is very cumbersome and difficult to make plaster cores of many parts that will fit together to yield close tolerances on the dimensions of the asesmbled cores. Of course, a main difficulty is in designing and making the several parts to interlock with precision so as to remain accurately together, when assembled, during casting and yet be capable of later easy sequential disassembly and removal from the green body. Second, joints or seams formed between contacting plaster core parts tend to impart complementing parting lines, mold marks or ridges on the formed cavity-defining surfaces of the green bodies, which are undesirable in certain cases. Besides creating an especially burdensome finishing problem in those bodies having a great many cavities with such ridge-like defects, they also can be difficult to remove from surfaces in cavities of complex shape or that are long with relatively small cross-section.

SUMMARY OF THE INVENTION

The foregoing noted shortcomings and limitations of the prior art techniques for producing slip cast bodies with a cavity or cavities of various shapes and sizes are avoided by the present invention, wherein unique composite core means is employed. According to this invention, a mold assembly comprises an open-top, vehicle-absorbent mold and at least one segmentally removable, vehicle-absorbent, composite core means in the mold and extending to the open-top thereof with an uppermost portion of the external surface of the core means thereby adapted and arranged to be exposed at the upper external surface of the slip cast body to be formed in the mold. Substantially the remaining portion of the external surface of the core means constitutes a cavity-forming surface for the body. More specifically, the composite core means is made of at least one of each of first and second segments that are rigidly united together without any surface indentation at the joint between segments that would produce the ridge-like marks on the cast body. The second segment or segments are made of plaster that is cast and hardened in contact with the foam or first segment or segments. Portions of both the first and second segments form the external surface of the core means, which includes the cavity-forming surface and the uppermost portion thereof adapted to be exposed at the upper external surface of the body formed against the cavity-forming surface. The part of the cavity-forming surface formed by the plaster or second segment or segments should be greater in area than the remaining part thereof formed by the foam or first segment or segments. The reason for the latter requirement is that the porous plaster is the most vehicle-absorbent component of the composite core means whereas the organic polymer foam exhibits relatively lower capacity to absorb the vehicle, which absorbtion is essential to promptly forming a hardened cavity-defining surface. Also, the second segment or segments are so constructed as to be movable, upon removal of the foam segments when formed cavity-defining surface portions of the body have developed self-sustaining shape, into the space theretofore occupied by the foam and away from the cavity-defining surface portions so that such second segment or segments are readily removable from the cavity or cavities in the formed body.

The present invention now makes it possible to provide one-piece cores that produce complex cavity or internal configurations, including vertical and upwardly convergent surfaces, in slip cast bodies and yet are segmentally removable—a feature not found possible in the prior art. Moreover, the composite core means make it possible to cast bodies to more precise shape and tolerances because of its united but segmentally removable nature, which eliminates ridge-like marks and the need to have draft angle allowance that may have to be removed in a finishing operation. The relatively elastically compressible nature of organic polymer foam (in contrast to the non-elastic nature of cast plaster) makes it possible to allow initial shrinkage of the green body structure to occur without causing detrimental cracking stresses therein. A very significant feature of organic polymer foam, of course, is the capability of being collapsed or destroyed within a matter of seconds or minutes by either suitable known solvents therefor or localized heat sufficient to decompose or disintegrate the foam without adversely heating the newly formed green structure. The latter technique of removing the foam can readily be accomplished by suitable probe-shaped, electric resistance rod heaters capable of producing at least about 700° F. (e.g. like those manufactured for insertion into the oil dip-stick shaft of automobile engines to warm the oil). Thus, the portion of a foam core segment exposed at the uppermost surface of the green body can be contacted by the solvent or heat and rapidly removed by continuing the application of either destructive agent to the descending exposed foam surface as it collapses down into the cavity formed by it in the green structure. As soon as that portion of the foam united to a plaster core segment is removed, the plaster core segment can be moved away from the green body surface formed against it and into the space vacated by the removed foam and then removed from the cavity. This capability of rapid sequential removal of the core segments as soon as a cavity-defining surface has developed self-sustaining shape makes it very easy to insure avoidance of detrimental shrinkage stresses that can produce cracking of the green body.

Although polystyrene foam is a prefrred one for use in this invention, any other desired organic polymer foam that is not readily compressible under slip loading can be employed instead. Examples of some other suitable foams are those of polyurethanes, polyesters, vinyl polymers, phenolic resins, polycarbonates, etc., all of which are well known and, by themselves, form no part of the present invention. Among the known solvents of polystyrene, acetone or toluene are preferred, especially acetone. When using some other foam, the better known solvents for it would be most desirable to secure the rapid removal. Of course, the alternative of using heat is applicable to any foam provided the cavity in which it lies is of a size and shape sufficient to permit entry of the probe-like heating element.

DESCRIPTION OF THE PREFERRED EMBODIMENTS

Figure 1:
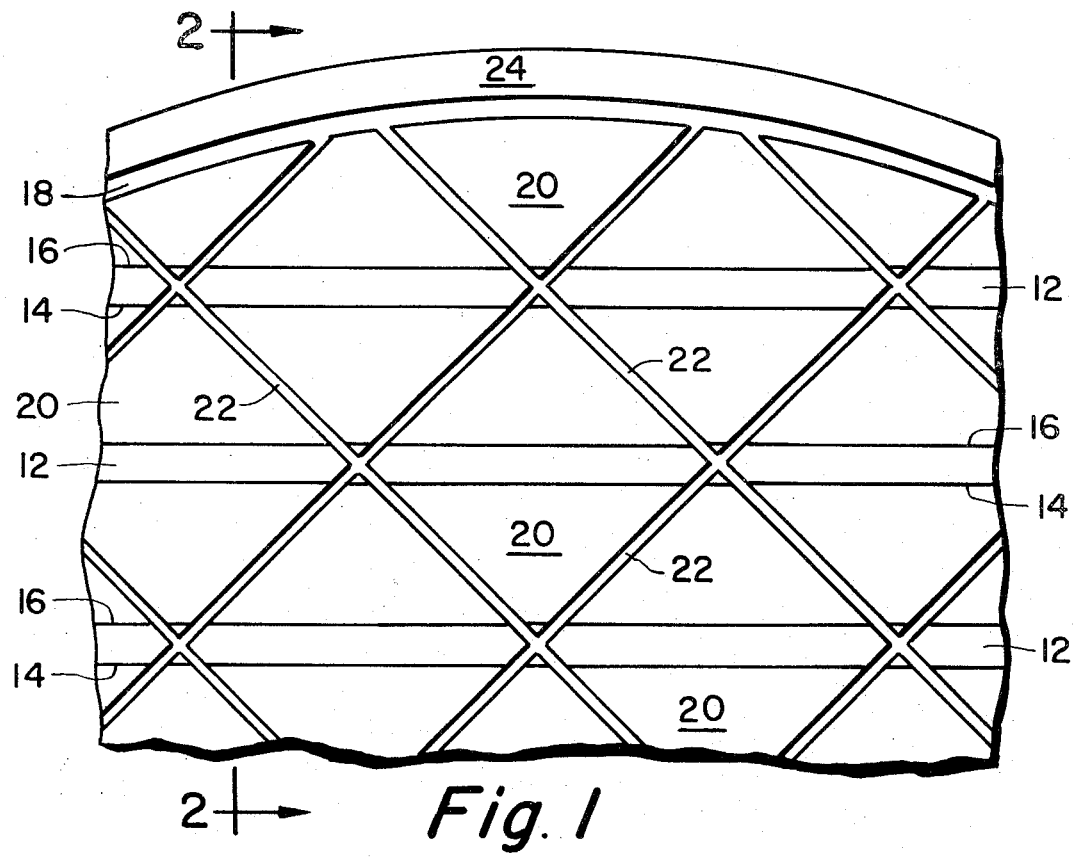
FIG. 1 is a fragmentary plan view of one embodiment of a composite core and mold assembly according to the present invention.
Figure 2:
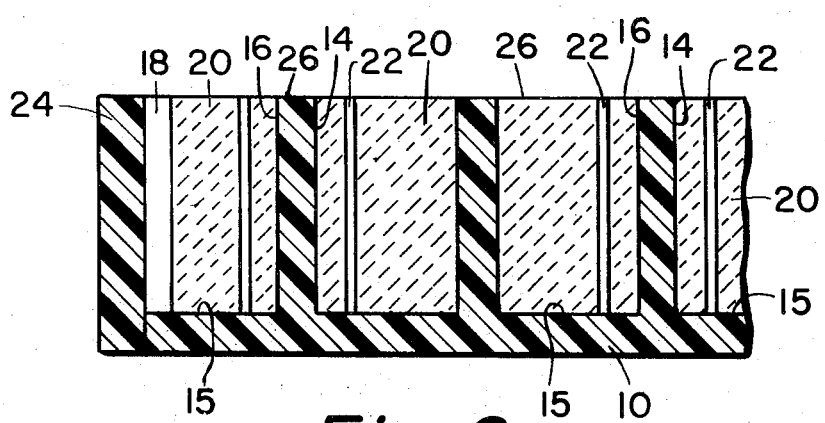
FIG. 2 is a fragmentary transverse cross-sectional view of the same composite core and mold assembly taken along line 2—2 of FIG. 1.
Figure 3:
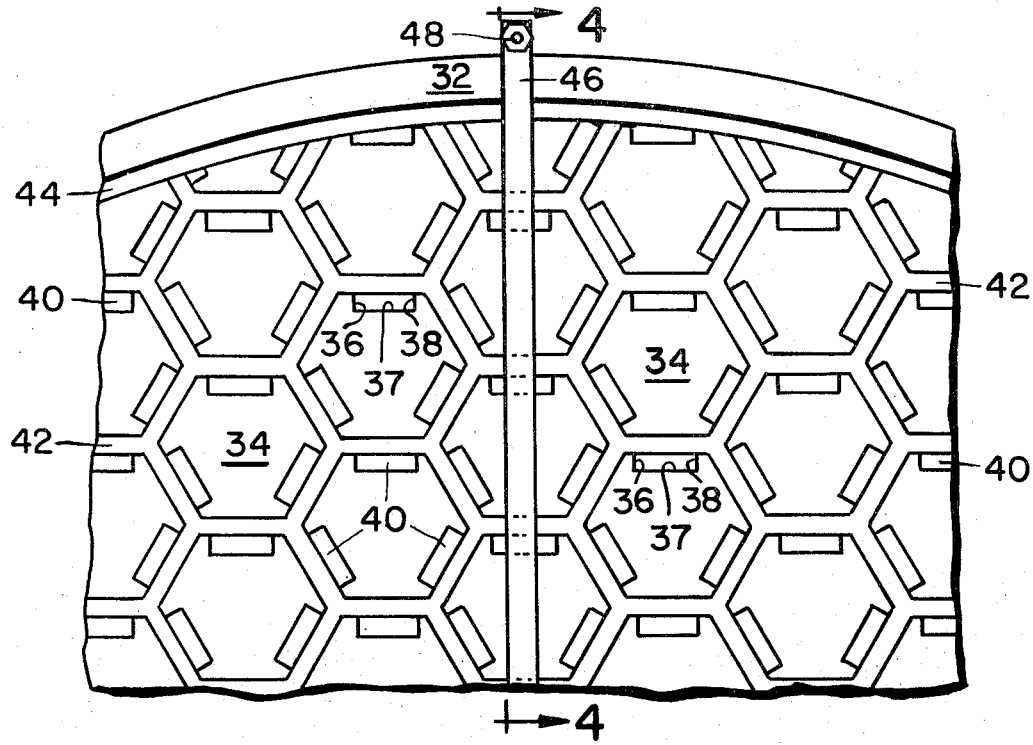
Figure 4:
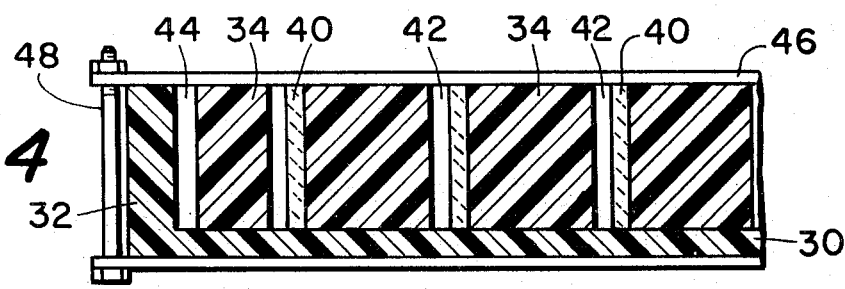
Figure 5:
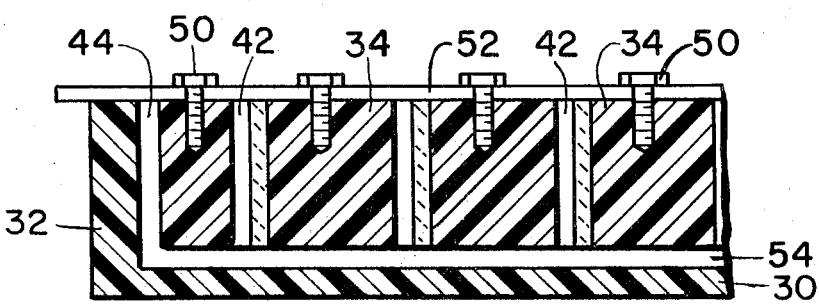

Referring to FIGS. 1 and 2, the base 10 of the mold and the core segments 12 are integrally formed out of one cylindrical piece of polystyrene foam by routing slots therein as defined by surfaces 14, 15, 16. Alternatively, separately formed segments 12 can be positioned and cemented on a separately formed mold base 10. Any known cement suitable for cementing bodies of the plastic or organic polymer materials can be employed. In preparation for forming the core segments of plaster, a core mold siding is formed of wood strips (not shown) into a hollow cylinder that is positioned on the base 10 in the space corresponding to the rim cavity 18 of the mold. A moist, moldable mass of plaster of Paris is then cast into the aforesaid slots, filling them level with the top of foam segments 12, and allowing this cast material to harden and dry in the form of porous plaster segments 20 rigidly united to the foam segments 12. In one particular embodiment, the foam segments 12 were made about ¼ inch wide and the plaster segments 20 were made about 2 inches wide. Either before or after removal of the wooden core mold siding, the composite body is then cut from its top surface down to the base 10 with a silicon carbide or other suitable masonry saw blade to form the crisscross cavity 22, having a width of about ⅛ inch, disposed diagonally to and intersecting within the foam segments 12. Next, a circumferential mold wall 24 of open-cell polystyrene foam (or optionally porous plaster) is cemented to the edge of base 10 to complete the mold assembly with a rim cavity 18 communicating with the crisscross cavity 22 defined by the rectangular composite cores of plaster and polystyrene foam therebetween. This mold assembly is used to make lightweight web support structures 3 feet in diameter and 3 inches high for fused silica mirrors. A known suitable slip is made by ball milling a mixture of granular fused silica with about 16–24 wt. percent of water until the fused silica is substantially all −325 mesh (Tyler) and well dispersed in the vehicle of water. This slip is then cast into the rim cavity 18 and crisscross cavity 22 so as to fill them up level with, but leaving exposed, the top surfaces 26 of the composite cores. As soon as the cast slip in the cavities is substantially hardened into a self-supporting structure principally by absorption of the water by the plaster segments 20 (which is readily determined by only a few trials), acetone is sprayed onto the foam segments 12 whereupon they immediately begin to collapse and the acetone spray is briefly continued until the foam segments 12 are completely collapsed down to and through the base 10. Plaster segments 20 can then be moved laterally into the space theretofore occupied by foam segments 12 and then lifted out of the rectangular cavities formed in the slip cast body by the composite cores. Subsequently, the dried slip cast web or honeycomb body is fired according to customary procedure (1100–1200° C.) to sinter it into a very coherent structure with as-fired dimensions usually within the required tolerances for the product.

We claim:

1. A mold assembly for forming a slip cast body with a cavity or cavities and from a slip of particulate inorganic material in volatile vehicle, which assembly comprises an open-top, vehicle-absorbent mold,
at least one segmentally removable, vehicle-obsorbent, composite core means in said mold and extending to the open-top thereof with an uppermost portion of the external surface of said core means adapted to be exposed at the upper external surface of said body formed in said mold, substantially the remaining portion of the external surface of said core means cooperating with said mold to define a mold cavity and constituting a cavity-forming surface for said body, said core means made of at least one of each of first and second segments that are rigidly united together,
said first segment or segments being organic polymer foam,
said second segment or segments being plaster cast and hardened in contact with said foam,
portions of said first and second segments forming said external surface, including said uppermost portion and said cavity-forming surface, the part of said cavity-forming surface formed by said second segment or segments being greater in area than the remaining part thereof formed by said first segment or segments,
said second segment or segments being movable, upon removal of said foam when formed cavity-defining surface portions of said body have developed self-sustaining shape, into space theretofore occupied by said foam and away from said surface portions so that said second segment or segments are readily removable from said cavity or cavities in said formed body.

2. The mold assembly of claim 1 wherein said organic polymer foam is polystyrene foam.

3. The mold assembly of claim 1 including a plurality of said core means spaced from each other and each said core means being made with a plurality of said second segments.

4. A method of forming a slip cast body by employing the mold assembly of claim 1, which comprises preparing a slip of particulate inorganic material in volatile vehicle,
casting said slip into said mold cavity and filling said cavity with said slip up to a level no higher than said uppermost portion of the external surface of said core means,
allowing said mold assembly to absorby said vehicle from said cast slip and to develop cavity-defining surface portions of said body that have self-sustaining shape,
when said surface portions of self-sustaining shape have developed, removing said first segment or segments of foam, and
thereafter moving said second segment or segments laterally into the space theretofore occupied by said first segment or segments and then removing said second segment or segments from the formed body cavity or cavities.

5. The method of claim 4 wherein said first segment or segments of foam are removed by applying thereto a solvent of said foam.

6. The method of claim 4 wherein said first segment or segments of foam are removed by applying thereto heat sufficient to disintegrate said foam.

7. A segmentally removable, vehicle-absorbent, composite core means for forming a cavity in a slip cast body, said core means being made of at least one of each of first and second segments that are rigidly united together,
said first segment or segments being organic polymer foam,
said second segment or segments being plaster cast and hardened in contact with said foam,
portions of said first and second segments forming the external surface of said core means, including a cavity-forming surface portion thereof and an upper most portion thereof adapted to be exposed at the upper external surface of said body, the part of said cavity-forming surface formed by said second segment or segments being greater in area than the remaining part thereof formed by said first segment or segments,
said second segment or segments being movable, upon removal of said foam when formed cavity-defining surface portions of said body have developed self-sustaining shape, into space theretofore occupied by said foam and away from said surface portions so that said second segment or segments are readily removable from said cavity or cavities in said formed body.

8. The core means of claim 7 wherein said organic polymer foam is polystyrene foam.

9. The core means of claim 7 including a plurality of said second segments.

References Cited

UNITED STATES PATENTS

| 3,133,133 | 5/1964 | Fairbanks | 264—59 |
| 3,467,738 | 9/1969 | Pyzel | 264—59 X |
| 3,520,668 | 7/1970 | Keefer | 264—317 X |
| 1,113,009 | 10/1914 | Howard et al. | 18—45 |
| 2,632,922 | 3/1953 | Kish | 18—59 |
| 3,218,376 | 11/1965 | Schindler, Jr. et al. | 264—86 |
| 3,290,421 | 12/1966 | Miller, Jr. | 264—86 X |
| 3,461,194 | 8/1969 | Alexander | 264—86 |

PHILIP E. ANDERSON, Primary Examiner

U.S. Cl. X.R.

249—125, 134, 142, 176; 264—59, 221, 304, 317, DIG. 44